United States Patent Office 3,834,886
Patented Sept. 10, 1974

3,834,886
POTASSIUM PHOSPHATE FERTILIZER PROCESS
Robert L. Somerville, Rte. 1, Box 256, Old Amwell Road,
Neshanic, N.J. 08853
No Drawing. Continuation of application Ser. No.
340,683, Mar. 13, 1973, which is a continuation of
application Ser. No. 263,449, June 16, 1972, which
in turn is a continuation of application Ser. No.
34,607, May 4, 1970, all now abandoned. This
application Nov. 14, 1973, Ser. No. 415,493
Int. Cl. C05b 7/00
U.S. Cl. 71—34  2 Claims

ABSTRACT OF THE DISCLOSURE

A process for preparing high analysis potassium phosphate fertilizer which comprises mixing a heated solution or slurry of mono- and diammonium phosphate with a heated slurry of potassium chloride in phosphoric acid, controlling the pH level of the mixture and then cooling to precipitate a complex material consisting primarily of monopotassium phosphate precipitates.

This is a continuation of application Ser. No. 340,683, filed Mar. 13, 1973, now abandoned, which in turn is a continuation of application Ser. No. 263,449, filed June 16, 1972, now abandoned, which in turn is a continuation of application Ser. No. 34,607, filed May 4, 1970, now abandoned.

BACKGROUND OF THE INVENTION

Heretofore, there has been practiced a method for manufacturing the alkali metal orthophosphates by using a neutralization reaction between orthophosphoric acid and an alkali substance selected from potassium hydroxide, sodium hydroxide, potassium carbonate, sodium carbonate, potassium bicarbonate and sodium bicarbonate. The method, however, has a disadvantage that the alkali substances are usually expensive as compared with potassium chloride and sodium chloride because they must be manufactured by the electrolysis of potassium chloride and sodium chloride or other chemical methods.

Also, there has been practiced a method for manufacturing an alkali metal phosphate by reacting orthophosphoric acid with alkali chloride at an elevated temperature at which hydrogen chloride gas is expelled. In such a method, the resulting alkali metal phosphate is substantially composed of meta-phosphate and pyrophosphate or the like. The alkali metal orthophosphates are scarcely obtained. In such a prior method, orthophosphoric acid must be used in excess of the stoichiometric amount required for chemical equilibrium in order to obtain the orthophosphates and the resulting product contains the alkali metal orthophosphate and free orthophosphoric acid.

SUMMARY OF THE INVENTION

It is the object of this invention to provide an economical process for producing relatively pure potassium phosphate by utilizing inexpensive raw materials such as wet process phosphoric acid and commercial fertilizer grade potassium chloride.

It is a further object to use conventional "preneutralizer" ammonium phosphate product in preparing relatively pure potassium phosphate for fertilizer purposes.

Various other objects and advantages of the subject invention will become apparent from the following description thereof.

I have now discovered a process for the production of high analysis water soluble potassium phosphate low in chloride content, which utilizes fertilizer grade raw materials and equipment conventional to the industry. Thus, the process comprises mixing a hot (100°–140° C.) concentrated solution or slurry of mono- and diammonium phosphate with a hot (100°–120° C.) slurry of potassium chloride in wet process phosphoric acid and, thereafter, cooling the mixture to precipitate out a complex material consisting primarily of monopotassium phosphate. Purification of the product as well as recovery of the by-products present in the filtrate may be undertaken, if desired.

DESCRIPTION OF THE PREFERRED
EMBODIMENTS

The general reaction procedure of this invention may be shown by means of the following chemical equation:

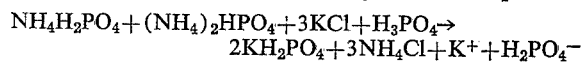

$$NH_4H_2PO_4 + (NH_4)_2HPO_4 + 3KCl + H_3PO_4 \rightarrow 2KH_2PO_4 + 3NH_4Cl + K^+ + H_2PO_4^-$$

In greater detail, the first reactant slurry comprises a mixture of mono- and diammonium phosphate produced from wet process phosphoric acid. This slurry is the conventional "preneutralizer" product of a T.V.A. complex fertilizer plant and is generally prepared by reacting anhydrous ammonia and phosphoric acid. In general, the slurry components are present at the maximum solubility level as reflected by a mol ratio of $NH_3/PO_4$ of about 1.3–1.7 in the slurry.

The second reactant slurry comprises potassium chloride and water in additional wet process phosphoric acid. The concentration of each component is selected in order to insure that the mol ratio of $NH_3$ to $PO_4$ in the final mixture is about 1.0, this being achieved by utilizing stoichiometric amounts of potassium chloride and phosphoric acid. The water is added to cause complete dissolution of the ammonium chloride which may form in the reaction mixture. A further consideration stems from the fact that the potassium phosphate is the least soluble salt in the resulting complex. Thus, in order to recover high yields of pure product and prevent formation of other phosphates, the pH of the reaction mixture must be controlled at a level of about 4.0–4.5 in order to neutralize only the first hydrogen ion.

Each of the resulting slurries is then heated to a temperature of about 100–140° C. The hot slurries are combined and thoroughly mixed and then allowed to cool while under agitation. Cooling can be accomplished commercially by vacuum evaporation in a vacuum crystallizer. As previously indicated, the monopotassium phosphate (potassium dihydrogen orthophosphate) is the least soluble salt in the complex and, accordingly, will precipitate out of solution in high yields. Separation from the mother liquor and drying of the product complete the preparative procedure.

The resulting potassium phosphate is a high analysis water soluble product which is prepared in yields generally exceeding about 80%. Of immense importance is the fact that the product, without further purification, exhibits a chloride content that is less than about 7%, by weight. The low chloride content is a decided advantage in fertilizer products inasmuch as the chloride has a tendency to agglomerate clay-type soil and make it untillable, thereby choking the root structure and contributing to the killing of plant life. Furthermore, chlorides are generally detrimental in agriculture, especially for such crops as tobacco and potatoes. Also, arid areas subject to irrigation have low chloride tolerance.

While the chloride content may be further reduced by washing the filter cake with water, such additional purification is not required inasmuch as the chloride content is sufficiently low, the salts dissolved in the product are not detrimental to agricultural use, and some loss in phosphate content may be experienced.

The mother liquor which remains after removal of the fertilizer product consists primarily of ammonium chloride, potassium and phosphate. These components may be recovered in order to further improve the economic balance of the instant process. Thus, the filtrate may be neutralized with lime to a pH level of 5.5 and then admixed with calcium chloride to precipitate dicalcium phosphate. This phosphate can be recovered as a feed grade material since the prior treatment has removed nearly all fluorine therefrom, it being essential in feed grade materials that the phosphorus:fluorine ratio exceed about 100:1. Furthermore, fluosilicic acid may be added to precipitate the potassium as $K_2SiF_6$. In turn, the potassium may be reclaimed from this product as the sulfate by reacting it with sulfuric acid and silica to drive off silicon tetrafluoride. The tetrafluoride so produced is absorbed in water to produce fluosilicic acid and silica.

Alternatively, the mother liquor can be concentrated by a vacuum evaporation-stage crystallization technique whereby the first stages recovered will be rich in potassium and phosphate which may be recycled to the primary reactor.

The ammonium chloride which is the primary by-product of the novel process of this invention, may be marketed directly or, in turn, may be treated with lime to produce calcium chloride as well as ammonia for recycle to the preneutralizer.

The potassium phosphate product may be directly used in fertilizer applications or it may be further processed in an ammoniator granulator to produce a mixed potassium ammonium phosphate of higher nitrogen analysis, e.g. $KNH_4HPO_4$.

The numerous advantages of the novel process of this invention are thus readily apparent. It is relatively simple and economical. It utilizes a stream from a preneutralizer from an ammonium phosphate plant as a starting material. It produces a potassium phosphate product which combines high analysis with low chloride content. The by-products of the process are independently utilizable in a variety of commercial applications.

By way of specific illustration of the novel process of this invention, 165 grams of wet process phosphoric acid analyzing 42.1% $P_2O_5$ was divided into two portions of 110 grams and 55 grams respectively. The 110 gram portion was then admixed with 75 milliliters of 29%, by weight, ammonium hydroxide to produce the eutectic mixture of mono- and di-ammonium phosphate.

The 55 gram portion of acid was admixed with 80 grams of potassium chloride and 80 grams of water. Each of the slurries was then heated to a temperature of 100–110° C. whereupon they were admixed and then allowed to cool, under agitation, to a temperature of 32° C. It is to be noted that the pH level of the reaction mixture was 4.5.

The crystallized potassium phosphate product was then filtered and dried at 100–110° C. Its fertilizer analysis indicated 4% N, 44.8% $P_2O_5$ and 24.8% $K_2O$. Of prime importance, the product contained only 7.2% chlorides as chlorine.

Analysis of the filtrate revealed the presence of substantial amounts of ammonium chloride as well as 6.7% potassium choride and 1.95% $P_2O_5$.

Summarizing, it is thus seen that this invention provides a novel process for the preparation of high analysis potassium phosphate. Variations may be made in procedure, proportions and materials without departing from the scope of this invention as defined by the following claims.

What is claimed is:

1. In the preparation of monopotassium phosphate the improved process which comprises the steps of admixing
   (1) a hot saturated solution obtained directly from preneutralization of a mixture of mono and diammonium phosphate at a mole ratio of $NH_3:PO_4$ of from about 1.3 to 1.7; and
   (2) a hot saturated solution of potassium chloride in water and wet process phosphoric acid as made, the mixture of solutions having a mole ratio of $NH_3:PO_4$ of about 1 and a pH of about 4.0 to 4.5;
cooling the resulting mixture to precipitate the monopotassium phosphate; and recovering the monopotassium phosphate product.

2. The process of claim 1, wherein the chloride content of said monopotassium phosphate is less than about 7%, by weight.

References Cited

UNITED STATES PATENTS 3,591,359    7/1971    Beckham _____ 71—34
3,619,133   11/1971    Fukuba _____ 423—310

SAMIH N. ZAHARNA, Primary Examiner

R. BARNES, Assistant Examiner

U.S. Cl. X.R.

23—302; 423—310, 313